C. E. W. WOODWARD.
PNEUMATIC TIRE.
APPLICATION FILED JAN. 5, 1906.
910,441.
Patented Jan. 19, 1909.
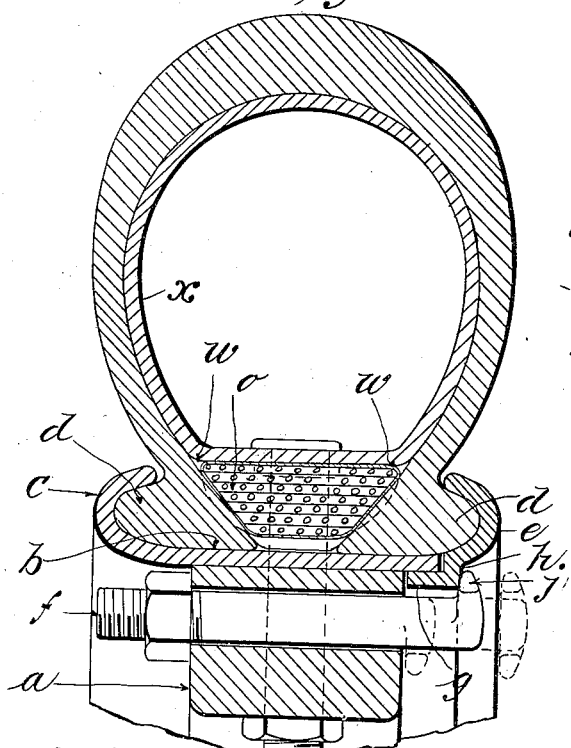
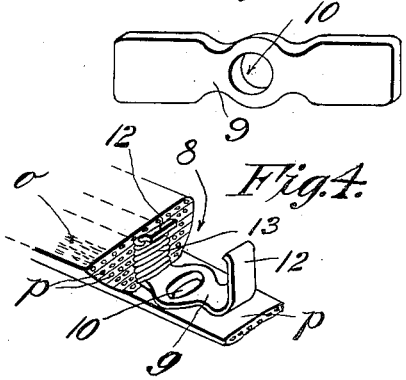
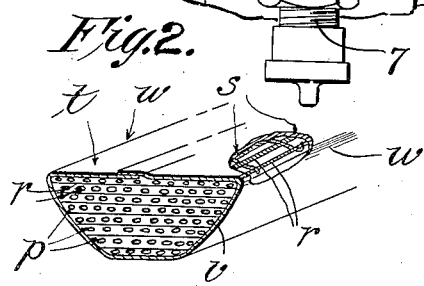
Witnesses:
H. L. Sprague
E. H. Scaholm
Inventor:
Charles E. W. Woodward.
by Chapin & Co.
Attorneys.

UNITED STATES PATENT OFFICE.

CHARLES E. W. WOODWARD, OF CHICOPEE FALLS, MASSACHUSETTS.

PNEUMATIC TIRE.

No. 910,441.      Specification of Letters Patent.      Patented Jan. 19, 1909.

Application filed January 5, 1906. Serial No. 294,767.

*To all whom it may concern:*

Be it known that I, CHARLES E. W. WOODWARD, a citizen of the United States of America, residing at Chicopee Falls, in the county of Hampden and State of Massachusetts, have invented new and useful Improvements in Pneumatic Tires, of which the following is a specification.

This invention relates to pneumatic tires for vehicles and it has special reference to the manufacture of clencher-tires, so called. In the manufacture of tires of this description, the outer casing, as is well known, is circumferentially divided midway between the sides of the base, and on the outer edges of the latter a bead is formed extending entirely around the casing outwardly, this bead engaging with the inturned edges of a metal rim, and in the original form of tire held in such engagement by the inflation of the tire. In later constructions, V-shaped metal clips have been applied to the interior surfaces of the casing near the rim and secured by bolts passing through the rim and felly to more securely hold the beaded edges of the base in engagement with the rim, and, as shown for example in the United States patent to Jeffrey #523,314 of July 17, 1894 and also in the patent to De Laski, Thropp and Deck #800,308 of September 26, 1905, a rubber ring, or a ring made of some hard material with rubber faced surfaces, has been located in the casing to bear on the converging inclined inner surfaces of the base to prevent the disengagement of the beaded edges thereof from the channels in the ring. This two part form of rim is coming into general use at the present time because it affords more convenient means for removing and replacing a casing, and my invention is particularly directed to overcoming certain defects and inconveniences in this class of clencher tires and rims.

Owing to the manner in which it is necessary to build up the outer casing and its base with the beaded edges referred to, it is not practically possible to manufacture the casings, the thickness of the base-parts of which, measured in a plane parallel with the surface of the rim, shall be uniform. Therefore, it is necessary to provide a locking ring to fit between the base-parts of the casing whether the latter be of maximum or minimum thickness, that is to say the ring must be capable of very considerable lateral compression but entirely inextensible circumferentially.

When the clamping devices are actuated, the ring has a tendency to bulge up into the casing under this lateral pressure, to overcome which De Laski *et als* applied a metal rim or band 16. For well known reasons the band 16 can not be made wide enough to cover the entire top of the ring in the De Laski construction for this would bring the edge of the metal into contact with the casing which would cut the latter in a short time. Furthermore, a band of sheet metal is totally inoperative in tires as constructed to-day with the heavy base portions, for a locking ring, such as described herein, can not be inserted in the casing unless it is flexible enough to permit it to be collapsed, the base portions of the tire being so rigid as to make it extremely difficult to stretch the casing open far enough to take in a non-collapsible ring, and these heavy base portions of the casing are one of the necessary conditions in tire construction at the present time, having been rendered necessary by the gradually increasing weight of the cars on which they are used, and the necessity of securing the tires in such manner as to make them stand the side strains to which they are subjected.

The object of this invention therefore is to provide a tire construction which shall preserve the useful characteristics of the fastening devices above described of which the two-part rim is an important feature, and to provide means whereby when the fastening devices are set up to lock the tire to the wheel, a laterally compressible but longitudinally inextensible ring of flexible material may be inserted in the casing, the interior diameter of which ring may be as much greater than that of the external diameter of the rim as desired, and the ring made of such material as to permit it to be collapsed or doubled in upon itself at any part thereof to temporarily reduce its diameter whereby it may be inserted in the casing between the base-parts thereof, the latter and the ring then being fitted over the rim together. Thus a ring may be made thick enough to extend into the casing to a point above the plane of the sides of the latter to form a cushion for the casing when it is deflated.

Still further objects of the invention reside in certain structural peculiarities which will be more clearly pointed out in the specification and relating particularly to means for providing a transverse depression in the locking ring at that point where the airvalve extends through it whereby the long stem of this valve may be more easily inserted in the hole provided therefor which extends through the felly, the rim, and the ring.

The invention is fully illustrated in the accompanying drawings in which—

Figure 1 is a sectional elevation of a tire and rim and fastening devices embodying the invention. Fig. 2 is a sectional perspective view of a portion of the locking ring which is located in the outer casing between the base part of the tire. Fig. 3 is a perspective view of a blank which may be bent up to form a metal bridging clip, and Fig. 4 is a perspective view of a part of a locking ring showing the bridging clip in position in a transversely located groove or depression extending through the locking ring.

Referring to the drawings, $a$ indicates the felly of the wheel, and $b$ the metal rim having a substantially flat seat for the base of the casing, one border of said rim being bent up, as at $c$, to form a channel for the reception of the bead or flange $d$ on one side of the base, a similar groove or channel being formed at the opposite side of the rim in a removable ring $e$ to receive a similar bead $d$ on the other side of the tire base. This ring $e$ is removably secured to the rim and felly by means of suitable fastening devices which, preferably, are in the form of bolts $f$ like that shown in Fig. 1, and which will permit of the easy removal of the clamping-ring $e$. A novel feature of this clamping-ring resides in the provision of a flange $g$ thereon substantially parallel with the rim and constructed to have a sliding fit under the border thereof which overhangs or extends beyond the side of the felly, the formation of this flange on the ring resulting in a shoulder $h$ against which the head $j$ of a bolt $f$ may bear, or, as shown in Fig. 1, against which the flanged head $m$ of a nut $n$ may bear to draw the clamping ring against the base of the casing to force it towards the center of the rim and through the medium of the locking-ring $o$ to force the bead $d$ on the opposite part of the base to a seat in the channel or groove formed in the border of that part of the rim which is permanently attached to the felly.

The locking-ring $o$ is, as has been stated, so constructed as to be non-stretchable or non-extensible, circumferentially, but it is so constructed as to be readily compressible laterally, and normally its transverse thickness is such that even when the base parts of the casing happen to be of the narrowest dimensions laterally, the setting up of the fastening devices will compress the ring transversely to a sufficient degree to insure the permanent engagement of the beads $d$ with the rim, and as this ring is non-extensible it follows that the disengagement of these beads from the rim can not be effected through any yielding of the ring in the plane of the wheel, even when the tire is deflated, for this ring does not depend in any degree for its locking function upon the pressure exerted against the surface thereof by the inflation of the tire.

The ring $o$ is made up of layers $p$ as shown in Figs. 1 and 2 which consist of flexible cords $r$ extending circumferentially around the ring, these cords, as shown in Fig. 2 particularly, having an occasional weft-thread $s$ interwoven therewith to preserve the position of parallel alinement of the cords one with the other, said weft-thread being loosely applied thereto to permit the cords to maintain a comparatively open relation one to the other. The fabric thus prepared is treated to a skin coating of thin rubber,—this coated fabric constituting the layers $p$ above referred to. In manufacturing this ring, it is made as all fabrics of this type are made by laying up these pieces of fabrics in a suitable mold, then vulcanizing the same under pressure, the mold being first lined with a strip of fine cloth $t$, (as shown in Fig. 2) of sufficient width to permit its edges to overlap on the upper side of the ring, this cloth being so treated as to cause it to adhere to the ring and to cause its overlapping portions to adhere one to the other. Thus, by applying these layers $p$ one to the other in the mold under sufficient tension, the cords $r$ constituting the warp of the fabric may be drawn tightly enough to take out any kink or slackness in the material, and when the whole ring is vulcanized, while it remains entirely flexible and laterally compressible, it is quite non-extensible.

In manufacturing the ring, the sides thereof extending to the under surface are made more or less bulging, as shown at $v$ Fig. 2, whereby a more uniform contact with the interior converging surfaces of the base portions of the tire may be effected when these base portions are moved one toward the other, and the ring $o$ laterally compressed. As the ring can not be distended owing to the constrictive action of the cords $r$, the more it is constricted laterally the greater will be the pressure against the base portions of the casing to hold the beads $d$ of the latter in engagement with the borders of the rim. To whatever pressure however the ring may be subjected, laterally, the top thereof from one edge to the other will maintain its substantially flat form and the upper borders $w$ of the ring can not possibly be forced up out of contact with the base portions whereby upturned ridges might be formed against which the inner tube $x$ might chafe, and the grip of the beads $d$ on the rim somewhat lessen.

As a matter of fact, if the ring $o$ should be under only relatively slight compression when the clamping ring $e$ is set up as far as possible, every portion of the ring would, even under these conditions, act as a solid wedge to prevent the disengagement of the beads $d$ of the base from the rim owing to the fact that the ring can not yield in the plane of the wheel, and, as stated, its locking function depends on its inextensible characteristic. In this respect it has all of the qualities of a binding ring of rigid material without any of the disadvantages of the latter, even though it were possible to introduce a rigid ring into the casing, which, for the reasons stated, is not possible except in very light casings, or rather casings with very light and flexible base-portions, and a casing of this kind is not adapted to be securely fastened by the devices described herein. It is therefore seen that an essential feature of this invention lies in the construction of a locking ring $o$ of the class described, the outer surface of which, when in operative position, will, under all conditions, remain practically in a position of parallelism with the rim of the tire even to the extreme borders of the ring, and while being circumferentially inextensible will, at the same time, be flexible enough to permit any part thereof to be bent inwardly to permit the easy insertion of the ring in a casing.

In that form of tires to which this invention is applicable, the casings and the bases thereof are, as stated, so heavy and relatively rigid that it is even difficult to distend the same when in position on the rim sufficiently to permit the lower end of the air-valve 7 to be swung into a position of alinement with the hole in the ring $o$, the rim, and the felly of the wheel, through which is must extend, as shown in Fig. 1 in the well known manner. Therefore, to make the assembling of these parts as easy and convenient as possible, a transverse groove or slot 8 may be formed in the ring $o$ as shown in Fig. 4, which will permit the air-valve 7 to be swung into a position of alinement with the hole through the rim and felly without obliging the operator to distend the casing far enough to swing the end of the tube over the top of the ring. This groove or slot 8 may extend quite through the ring, as shown in Fig. 4, or only partly therethrough, as occasion requires, but in any event if such slot be formed in the ring, it is necessary to provide means for bridging this slot to maintain the unstretchable condition or characteristic of the ring circumferentially which is its most essential characteristic. A good way of bridging this transverse groove is to form a clip 9 having a hole 10 therethrough to receive the air-valve 7, this clip having upturned ends 12, as shown, the clip being made from a blank of metal, as shown in Fig. 3. In constructing a ring with this bridging clip therein, after laying the lowermost strip of fabric $p$ in the mold in which the ring is made, the clip is located thereon as shown in Fig. 4, then each layer as it is placed in the mold, after being stretched around in the latter in proper position, has its ends cut off in close proximity to the upturned ends 12 of the clip and between each two successive layers a cord 13 is passed around the upturned end of the clip and then carried back over the surface of the strip; and this cord being coated with rubber will be sufficiently adherent to the rubber-coated surfaces of the different layers $p$ to make a strong and unyielding connection between each of the layers $p$ and the clip, especially after the ring has been vulcanized. If desired, the space in this groove 8 may be filled in by a suitably formed washer placed under the head of the air-valve to the end that the inner tube may have a level seat. It is to be borne in mind, however, that the groove 8 illustrated in Fig. 4, is quite out of proportion and was only so drawn for the sake of clearness. In practice, it need only be as wide as the diameter of the inner end of the air-valve and generally would not extend more than part way through the ring.

Having thus described my invention, what I claim and desire to secure by Letters Patent of the United States, is—

1. A tire construction comprising an outer casing having circumferentially disposed locking ribs, a locking ring consisting of inextensible flexible material capable of lateral compression without displacement of its exterior surface, said ring being provided with a laterally disposed groove, and means in the groove for locking the ends of the ring together.

2. In a tire of the character described, a locking ring therefor consisting of circumferentially inextensible material, said material comprising circumferentially extending cords and transversely extending weft-threads interwoven therewith.

3. In a tire of the character described, a locking ring therefor consisting of circumferentially inextensible material, said material comprising circumferentially extending cords arranged in layers and transversely extending weft-threads interwoven therewith, the ring having separable ends, a locking device secured to said ends, the locking device being mounted in a transversely extending groove in the ring, the securing means for the locking device consisting of a cord, as 13, passed around the clips and between each two successive layers of the locking ring.

4. A tire construction comprising an outer casing having circumferentially disposed locking ribs, a locking ring consisting of inextensible flexible material arranged in layers and having oppositely disposed convex sides, a locking means for securing the ends of the ring together and formed with oppositely disposed hooked ends, the same being located in a transversely disposed opening of the ring, the hooked ends being secured to the ends of the ring, said securing means comprising a series of cords passed around the ends of the locking means and between each two successive layers of the locking ring.

CHARLES E. W. WOODWARD.

Witnesses:
H. A. CHAPIN,
H. W. BOWEN.